(12) United States Patent
Hakman et al.

(10) Patent No.: US 10,937,562 B2
(45) Date of Patent: Mar. 2, 2021

(54) CELLULOSE BASED ELECTRICALLY INSULATING MATERIAL

(71) Applicant: ABB Power Grids Switzerland AG, Baden (CH)

(72) Inventors: Leif Hakman, Oskarshamn (SE); Torbjorn Brattberg, Oskarshamn (SE); Anna Wahlberg, Stockholm (SE); Lars Schmidt, Oskarshamn (SE)

(73) Assignee: ABB Power Grids Switzerland AG, Baden (CH)

( * ) Notice: Subject to any disclaimer, the term of this patent is extended or adjusted under 35 U.S.C. 154(b) by 708 days.

(21) Appl. No.: 14/336,818

(22) Filed: Jul. 21, 2014

(65) Prior Publication Data

US 2014/0327504 A1 Nov. 6, 2014

Related U.S. Application Data

(63) Continuation of application No. PCT/EP2013/050811, filed on Jan. 17, 2013.

(30) Foreign Application Priority Data

Jan. 20, 2012 (EP) ..................................... 12151937

(51) Int. Cl.
| | |
|---|---|
| *H01B 3/52* | (2006.01) |
| *C08L 1/02* | (2006.01) |
| *C08L 67/04* | (2006.01) |
| *D21H 17/53* | (2006.01) |
| *D21H 21/14* | (2006.01) |

(Continued)

(52) U.S. Cl.
CPC .................. *H01B 3/52* (2013.01); *C08L 1/02* (2013.01); *C08L 67/04* (2013.01); *D21H 17/53* (2013.01); *D21H 21/14* (2013.01);

*D21H 27/00* (2013.01); *H01F 41/005* (2013.01); *C08K 5/01* (2013.01); *Y10T 428/31993* (2015.04)

(58) Field of Classification Search
None
See application file for complete search history.

(56) References Cited

U.S. PATENT DOCUMENTS

| | | | |
|---|---|---|---|
| 2,707,204 | A | 4/1955 | Richardson et al. |
| 3,466,378 | A | 9/1969 | Mathes |
| 4,096,313 | A | 6/1978 | Fujita et al. |

(Continued)

FOREIGN PATENT DOCUMENTS

| | | |
|---|---|---|
| EP | 0304693 A1 | 3/1989 |
| GB | 665601 A | 1/1952 |

(Continued)

OTHER PUBLICATIONS

Ullmann's Encyclopedia of Industrial Chemistry, (2014) at 26, Table 6 (reporting a melting point of 160-167° C for standard polypropylene).*
International Preliminary Report on Patentability Application No. PCT/EP2013/050811 Completed: Feb. 17, 2014 11 pages.

(Continued)

*Primary Examiner* — Chinessa T. Golden
(74) *Attorney, Agent, or Firm* — Sage Patent Group

(57) ABSTRACT

An electrical device including a cellulose based electrically insulating composite material in the form of a paper or pressboard, the composite material having cellulose fibres; and an electrically insulating thermoplastic polymer material; wherein the polymer material is arranged around and between the cellulose fibres, and binds the fibres to each other.

20 Claims, 2 Drawing Sheets

(51) Int. Cl.
*D21H 27/00* (2006.01)
*H01F 41/00* (2006.01)
*C08K 5/01* (2006.01)

(56) References Cited

U.S. PATENT DOCUMENTS

| | | | | |
|---|---|---|---|---|
| 5,478,640 | A | * | 12/1995 | Berbner ................ D21H 13/22 |
| | | | | 428/324 |
| 6,352,655 | B1 | * | 3/2002 | McShane ................ C09K 5/10 |
| | | | | 174/17 LF |
| 6,673,463 | B1 | * | 1/2004 | Onishi .................... C08J 11/14 |
| | | | | 209/3 |
| 2002/0012759 | A1 | | 1/2002 | Asayama et al. |
| 2005/0143508 | A1 | * | 6/2005 | Tyagi .................... C08L 25/12 |
| | | | | 524/423 |
| 2005/0150593 | A1 | * | 7/2005 | Honma .................... B32B 5/08 |
| | | | | 156/245 |
| 2009/0275678 | A1 | * | 11/2009 | Kumazawa ............ C08L 67/00 |
| | | | | 523/523 |
| 2010/0018751 | A1 | * | 1/2010 | Czyzewski ............ H01B 17/28 |
| | | | | 174/143 |
| 2010/0125112 | A1 | * | 5/2010 | Chung .................... C08J 5/045 |
| | | | | 523/205 |

FOREIGN PATENT DOCUMENTS

| | | | | |
|---|---|---|---|---|
| GB | 1127301 | A | * 9/1968 | ............. H01B 3/441 |
| JP | 01021567 | B | 4/1989 | |
| JP | 2002110414 | | 4/2002 | |
| WO | 9205311 | A1 | 4/1992 | |
| WO | 2006118536 | A1 | 11/2006 | |
| WO | 2009008822 | A1 | 1/2009 | |
| WO | 2011073709 | A1 | 6/2011 | |

OTHER PUBLICATIONS

International Search Report and Written Opinion of the International Searching Authority Application No. PCT/EP2013/050811 Completed: Mar. 7, 2013; dated Mar. 15, 2013 10 pages.
Indian Examination Report dated Nov. 29, 2018 for Indian Patent Application No. 6190/CHENP/2014, 7 pages.

* cited by examiner

CELLULOSE BASED ELECTRICALLY INSULATING MATERIAL

FIELD OF THE INVENTION

The present disclosure relates to an electrical device comprising a cellulose based electrically insulating material.

BACKGROUND OF THE INVENTION

Insulation of oil-filled distribution and power transformers may be made from cellulose. The cellulose is converted by means of a paper machine to presspaper or pressboard. The pressboard is further converted to different insulation elements used in transformers. These elements include spacers, barriers, pressrings and strips. For transformers operating at higher temperatures, or hot-spots in transformers, also Nomex-based insulation or combinations of Nomex and cellulose are used.

Pressboards are made of unbleached sulfate pulp. The pulp is prepared and then dried in sheets, by heating and pressing at the same time.

Cellulose based insulation has very good insulation properties in combination with oil (e.g. resistance to streamers). However, cellulose based insulation may be subject to shrinkage upon drying of the transformer (typically 2-6% of the pressboard thickness). The shrinkage may make it necessary to adjust the height of the transformer winding in an iterative process during drying of the transformer winding due to shrinkage of the spacers of the winding.

US 2010/0193116 discloses a method for manufacturing a composite material having reduced mechanosorptive creep. The method includes mixing fibres of a lignocellulosic material with a thermoplastic material where the thermoplastic material is in fibre form.

WO 03104559 discloses paper for use in transformers where the wood pulp has been mixed with a polyhydroxy polymer, such as polyvinyl alcohol, as a dry strength additive.

US 2004/40072 discloses a paper of cellulose fibres, a polymeric binder and aramid fibres for use in transformers. The polymeric binder may be polyvinyl alcohol, again as a dry strength additive.

WO 2009/008822 relates to a method for manufacturing a composite material having reduced mechanosorptive creep comprising the following steps: a) mixing fibres of a lignocellulosic material with a thermoplastic material where the thermoplastic o material is in fiber form, b) adding the mixture made in step a) onto a wet web, thus forming a composite material and c) hot pressing of the composite material. The pressing is preferably performed at a at a temperature close to the melt point of the thermoplastic material.

US 2002/012759 relates to a moulding base paper used for forming paper vessels such as a cup or tray for foods and various industrial products. The paper comprises a synthetic resin layer on at least one surface thereof.

WO 92/105311 relates to cellulosic pulp products bonded by a resin containing polyhydroxy acid with improved wet and dry strengths, and their preparation. It is necessary to heat soften the resin polymer to bond the cellulosic fibre or to melt the polymer to impregnate and coat the cellulosic pulp fibres.

EP 0 304 693 relates to a flame retardant electrical laminate prepared by impregnating a base material with a halogen-containing unsaturated polyester resin which is prepared by dissolving a halogen-containing unsaturated polyester into a polymerizable monomer, and then curing the halogen-containing unsaturated polyester resin.

SUMMARY OF THE INVENTION

According to one aspect of the present invention, there is provided an electrical device comprising a cellulose based electrically insulating composite material in the form of a paper or pressboard, the material comprising: cellulose fibres; and an electrically insulating thermoplastic polymer material; wherein the polymer material is arranged around and between the cellulose fibres, and binds said fibres to each other.

An improved electrical device is obtained by using the electrically insulating composite material in accordance with the present invention. By forming a composite material of cellulose fibres and a thermoplastic polymer material, which polymer material has been melted around the cellulose fibres, an electrically insulating material with improved properties may be obtained. Specifically, the composite material displays reduced shrinkage upon drying, e.g. when drying a transformer comprising the composite material. The composite material may e.g. be dried from a water content of about 2% to about 0.5%. This drying should not be confused with the drying during pressing and production of the composite material. The reduced shrinkage may partly be due to the reduced moisture uptake of the composite material as compared with regular pressboard material, and partly due to the thermoplastic polymer material making the composite material more rigid. The inventive composite material also exhibits improved mechanical properties, such as reduced creep and improved compressive strength. By virtue of the thermoplastic polymer material, the composite material may also be thermoformable, allowing for producing the composite material in different shapes, such as complex shapes.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION OF THE INVENTION

Figure 1:
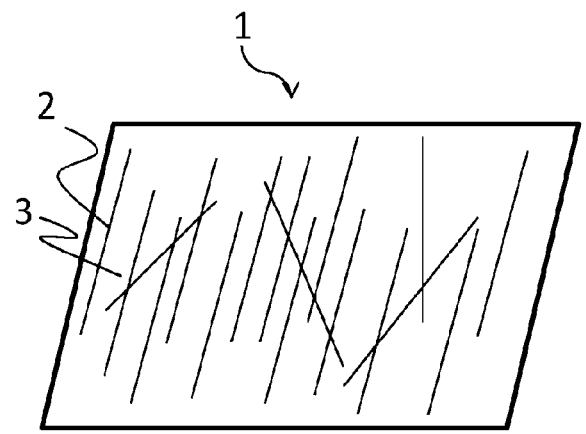
FIG. 1 is a schematic diagram of an embodiment of a cellulose based electrically insulating composite material in accordance with the present invention.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The cellulose fibres may be essentially pure cellulose fibres, or they may contain some hemicellulose and lignin in addition to cellulose.

The electrical device may be any electrical device which comprises electrical insulation, e.g. an electrical transformer or an electrical motor, which may especially benefit from the composite material.

The composite material is electrically insulating and is suitable for use as insulation in an electronic device. The composite material may e.g. be used as high voltage insulation in a high voltage device, such as in a high voltage transformer, whereby the composite material may be a high voltage insulation material.

The composite material of the present invention may be in the form of a matrix of the cellulose fibres and the thermoplastic polymer material. The composite material thus does not comprise fibres of cellulose and fibres of thermoplastic polymer material more or less loosely bound to each other. Nor is the composite material a laminate of a cellulose layer and a thermoplastic polymer layer. Rather, the thermoplastic polymer material may have been melted, or at least softened enough to get sticky, such that it coats the cellulose fibres and fills up space between the cellulose fibres to form the composite material and/or such that the polymer material binds the cellulose fibres together.

The composite material may be in the form of a paper, spacer, barrier, strip or press ring for insulation in or of an electrical device, such as a conductor of electricity, an electrical transformer or an electrical motor. The composite material has electrically insulating properties which may be useful in any electrical device, such as for insulating an electricity conduit, but the composite material may be especially advantageous in an oily environment, such as in an electrical transformer. Specifically, the composite material may be used for making electrically insulating spacers in a transformer winding.

The composite material may be essentially pure, or it may be at least partly impregnated. The composite material may be impregnated with an insulation liquid such as impregnation oil, e.g. in electrical motor or oil impregnated electrical transformer e.g. distribution transformer. Additionally or alternatively, the composite material may be impregnated with an insulating gas such as nitrogen, dry air and/or SF6. Additionally or alternatively, the composite material may be impregnated with a solid material such as a solidifying liquid, e.g. a reacting thermoset (e.g. an epoxy resin, e.g. used in dry transformers).

The thermoplastic polymer material may be added to and mixed with the cellulose fibres in different forms, such as in a solvent process e.g. where the cellulose fibres are coated with the polymer material, as fibres of the polymer material or as a powder of the polymer material. The thermoplastic polymer material may e.g. have been added to a paper pulp comprising the cellulose fibres, before or after grinding of the pulp, or mixed with the cellulose fibres at a later stage.

The thermoplastic polymer material should be thermoplastic in order to be able to melt and solidify during production of the composite material. The thermoplastic polymer material may thus have a melting point temperature and/or glass transition temperature which allows the melting of the polymer material, to make the polymer material liquid, at a temperature which is not so high as to make the production unduly expensive or damages the cellulose fibres. On the other hand, the polymer material should have a melting point temperature and/or glass transition temperature which allows the composite material to be resistant to the temperatures it is subjected to when used as electrical insulation, e.g. in a transformer or motor. Thus, the thermoplastic polymer material may have a melting point of less than 200° C., such as less than 190° C. or less than 180° C. The thermoplastic polymer material may have a melting point above 140° C., such as above 150° C., above 160° C. or above 170° C. The thermoplastic polymer material may have a glass transition temperature of less than 120° C., such as less than 110° C., less than 100° C., less than 90° C., less than 80° C. or less than 70° C. The thermoplastic polymer material may have a glass transition temperature above 50° C., such as above 60° C.

Conveniently, the thermoplastic polymer material is present in the composite material in an amount of from 1 to 30 percent by weight, such as 1 to 15 wt % or in some embodiments preferably 5 to 10 wt %. This amount may be suitable for coating or binding the cellulose fibres to each other to form the composite material.

The thermoplastic polymer material may preferably be air permeable so as not to trap air bubbles in the composite material during production thereof. For instance, polyester may be unsuitable as thermoplastic polymer material for the present invention since it may not be air permeable. Similarly, the thermoplastic polymer material may preferably be water moisture permeable so as not to trap moisture in the composite material during production thereof or during drying of an electrical device, e.g. transformer, which it is included in. Similarly, the thermoplastic polymer material may preferably be oil permeable so as not to hinder the drying of the composite material and any electrical device which it is included in when oil is used for drying. However, in other embodiments of the present invention, the polymer material may not be air and/or oil permeable.

The thermoplastic polymer material may be stable in oil, such that if the composite e.g. is impregnated with insulation oil, the polymer material is stable. The polymer material may have an open cell/foam structure such that insulation oil or other insulation liquid may fill cells/voids formed by the polymer material and/or such that air or other gas is not trapped in the polymer material. Thus, the polymer material may form an open foam structure, i.e. with no, low level of or at least reduced, closed pores.

The thermoplastic polymer material may comprise or consist of polylactic acid (PLA), also called polylactide. PLA has a suitable melting point and glass transition temperature and is biodegradable. The chirality of lactide allows for several forms of PLA, but it may be preferred to use poly-L-lactide (PLLA), also known as poly-L,L-lactide, or a mixture of the different lactide forms. PLLA has a melting point temperature of about between 173-178° C. and a glass transition temperature of about between 60-65° C. Alternatively, the thermoplastic polymer material may comprise or consist of a polyester such as polyethylene terephthalate (PET), in which case the thermoplastic polymer material may have a melting point above 200° C. and the heating step for producing the composite material may include heating to a temperature above 200° C.

As mentioned above, the composite material may have especially beneficial electrically insulating properties in an oily environment. Thus, the composite material may be at least partly soaked in oil.

Below, the figures are discussed. Reference is also made to the rest of the present disclosure where the elements of the figures are further discussed even if not specifically referring to the figures.

FIG. 1 is a schematic diagram of an embodiment of a cellulose based electrically insulating composite material 1 according to the present invention. The composite material 1 is in the form of a pressboard. The composite material 1 comprises cellulose fibres 2, schematically represented by a few lines 2 in FIG. 1. In the space formed between the cellulose fibres, there is a thermoplastic polymer material 3 which has melted around and between the fibres 2 and then solidified.

Figure 2:
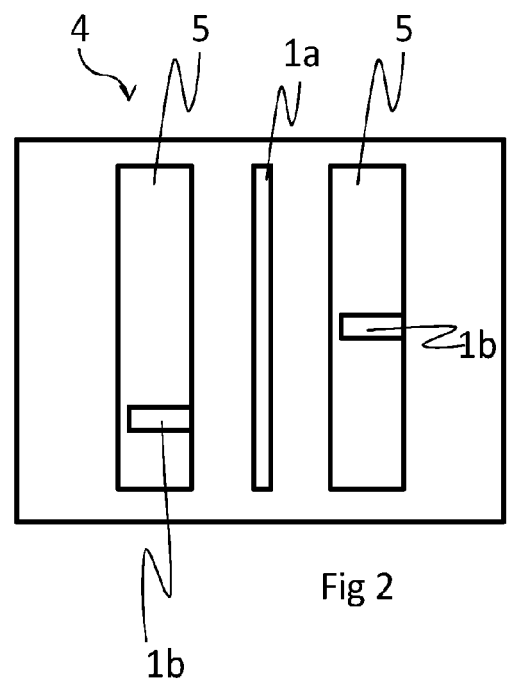
FIG. 2 is a schematic diagram of an embodiment of a transformer according to the present invention.

FIG. 2 is a schematic diagram of an embodiment of a transformer 4 according to the present invention. The embodiment of the transformer 4 comprises a plurality of coils 5 with electrically conductive windings. The composite material 1 may be used for electrical insulation in the transformer 4. For instance, a barrier 1a made from the composite material 1 may be positioned between two coils 5 to insulate the coils 5 from each other. Alternatively or additionally, spacers 1b made from the composite material 1 may be used in the coils 5. It should be noted that the transformer 4 may comprise many more structural parts than those shown in FIG. 2, and the composite material 1 may be used for insulation in many different ways and in many different places in the transformer 4. Also, the transformer 4 has been chosen as an illustrative example of an electrical device which may comprise the composite material 1. Many other examples exist too, such as an electrical motor or a conduit for electricity.

Figure 3:
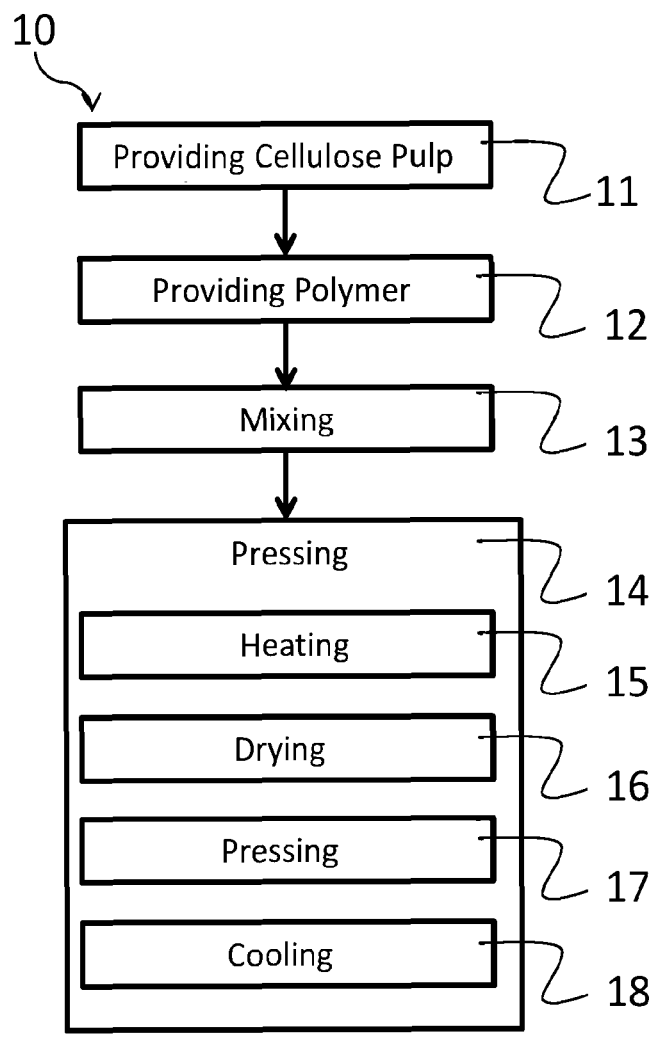
FIG. 3 is a schematic flow chart of an embodiment of a method according to the present invention.

FIG. 3 is a schematic flow chart of an embodiment of a method 10 according to the present invention, for producing a cellulose based electrical insulation material 1, e.g. for an electrical transformer. A cellulose pulp, e.g. sulphate pulp (typically unbleached), is provided 11. Also a thermoplastic polymer material 3 is provided 12. The pulp and the polymer material are then mixed 13 with each other. A paper press, multi-daylight hot press or the like, is then used for pressing 14 the mixture to provide a pressboard or presspaper or the like of the composite material 1 discussed herein. The pressing 14 also comprises heating 15 and drying 16 the mixture, as well as pressing 17 the mixture to the pressboard or presspaper. The heating is to a temperature depending on the thermoplastic polymer material used, but should be high enough to allow the thermoplastic polymer material to melt sufficiently to bind the cellulose fibres to each other upon solidifying. The drying 16 may be at least partly achieved by means of the heating 15, evaporating moisture from the mixture, and/or at least partly by means of the pressing 17, pressing moisture from the mixture. After the drying 16, whereby sufficient amount of moisture has been removed and the mixture is sufficiently dry, the pressed 17 mixture is allowed to cool 18. The polymer material 3 has melted due to the heating 15, melting around and between the cellulose fibres 2 of the pulp, as discussed herein. During the cooling 18, the polymer material 3 solidifies, making the board 1 rigid. The cooling 18 may additionally or alternatively be performed separate from the pressing 14 with the paper press. The heating 15 and the pressing 17 may take place at the same time in the paper press, drying 16 the mixture and forming it into a pressboard or the like. The cooled 18 pressboard may then be cut into desired insulation parts 1a; 1b, e.g. for use in a transformer or any other electrical device. For instance, a spacer, barrier, strip or press ring for insulation of an electrical transformer, can be produced from the composite material, e.g. by cutting the composite material 1.

Example

A composite material 1 according to the present invention, which composite material is a cellulose pressboard comprising PLA as the thermoplastic polymer material, was produced and tested for its properties. The properties were compared to the corresponding requirements according to the International Electrotechnical Commission (IEC), IEC standard IEC 60641-3-2.

TABLE 1

| Property | Inventive Material | IEC |
| --- | --- | --- |
| Moisture Content | 1.43% | <6% |
| Tensile strength MD | 112 MPa | >100 MPa |
| Shrinkage % MD | 0.08% | <0.5% |
| Shrinkage % CMD | 0.21% | <0.7% |
| Shrinkage % Z | 0.46% | <6% |
| Compressibility % | 7.8% | <10% |
| Compressibility Rev. % | 60% | >45% |
| Conductivity | 5 µS/cm | 5 µS/cm |

Rev. = Reversible compression (spring back);
Z = thickness direction;
MD = Machine Direction (the longitudinal direction of the paper machine and the direction in which the paper web travels);
CMD = Cross Machine Direction.

It was also determined that the inventive composite material was compatible with oil.

As can be seen in Table 1, the inventive composite material fulfils the requirements of IEC for the tested properties. It is especially noted that the shrinkage is exceptionally low, e.g. with the shrinkage in the Z direction (thickness) being only 0.46%. The shrinkage was determined by measuring the dimension before and after drying, from 1.5% to 0% moisture.

The composite material may e.g. be an electrical high voltage insulation composite material in the form of a paper or pressboard which comprises cellulose fibres and a polymer material in the form of reinforcing fibres. The reinforcing fibres may have a melting or degradation temperature which is higher than the maximum process temperature where the composite material is used as insulation in e.g. a transformer. The polymer material may additionally or alternatively have the function of a thermoplastic binder, binding the cellulose fibres and the reinforcing fibres together. The composite material may have an open-porous structure. The composite material may have been produced in a solvent-born process on a paper machine. The temperature at pressing in the paper machine may be higher than the melting point temperature of the polymer material.

Below follow some other aspects of the present invention.

According to an aspect of the present invention, there is provided a cellulose based electrically insulating composite material in the form of a paper or pressboard, the material comprising cellulose fibres and a thermoplastic polymer material, wherein the polymer material is arranged around and between the cellulose fibres such as to coat said fibres and/or bind said fibres to each other.

According to another aspect of the present invention, there is provided a use of a composite material according to the above aspect of the invention, for electrical insulation in an electrical device, e.g. an electrical motor or an electrical transformer.

According to another aspect of the present invention, there is provided an electrical transformer comprising insulation comprising the composite material according to the above aspect of the invention.

According to another aspect of the present invention, there is provided a method of producing a cellulose based electrical insulation material for an electrical transformer, the method comprising providing a pulp comprising cellulose fibres, providing a thermoplastic polymer material, mixing the pulp with the polymer material to form a mixture, and pressing the mixture in a paper press to form a pressboard. The pressing comprises heating the mixture such that the thermoplastic polymer material melts to lay around and between the cellulose fibres, drying the mixture to remove moisture from the mixture, pressing the mixture into a board, and cooling the board such that the melted polymer solidifies such that the polymer material is arranged around and between the cellulose fibres such as to coat said fibres and bind said fibres to each other.

According to another aspect of the present invention, there is provided a method of producing a cellulose based electrically insulating composite material for an electrical transformer, the method comprising: providing a pulp comprising cellulose fibres; providing a thermoplastic polymer material; mixing the pulp with the polymer material to form a mixture; pressing the mixture in a paper press to form a pressboard; wherein said pressing comprises: heating the mixture such that the thermoplastic polymer material melts to lay around and between the cellulose fibres, drying the mixture to remove moisture from the mixture, pressing the mixture into a board, and cooling the board such that the melted polymer solidifies and binds the cellulose fibres to each other; and producing a spacer, barrier, strip or press ring for insulation of an electrical transformer, from the composite material.

A method aspect of the present invention may be used for producing an embodiment of the composite material of the present invention.

The present disclosure has mainly been described above with reference to a few embodiments. However, as is readily appreciated by a person skilled in the art, other embodiments than the ones disclosed above are equally possible within the scope of the present disclosure, as defined by the appended patent claims.

What is claimed is:

1. An electrical transformer, comprising:
   an oil tank filled with oil; and
   a cellulose based electrically insulating composite material disposed in the oil tank, the composite material comprising:
      cellulose fibres in an amount of 85 to 99 wt % of the composite material; and
      an electrically insulating thermoplastic polymer material in an amount of 1 to 15 wt % of the composite material,
   wherein the thermoplastic polymer material is arranged around and between the cellulose fibres, and binds said fibres to each other,
   wherein the composite material is at least partly impregnated with the oil, and
   wherein the thermoplastic polymer material has a melting point of between 140° C. and 200° C., and
   wherein the composite material is configured to shrink less than 0.5% in response to drying the transformer.

2. The electrical transformer of claim 1, wherein the composite material is in the form of a spacer, barrier, strip or press ring.

3. The electrical transformer of claim 1, wherein the thermoplastic polymer material has a glass transition temperature of between 50° C. and 120° C.

4. The electrical transformer of claim 1, wherein the thermoplastic polymer material comprises polylactic acid.

5. The electrical transformer of claim 1, wherein the composite material has an open foam structure.

6. The electrical transformer of claim 1, wherein the thermoplastic polymer material is permeable to at least one of air, water, or oil.

7. The electrical transformer of claim 1, wherein the thermoplastic polymer material includes poly-L-lactide.

8. The electrical transformer of claim 1, wherein the thermoplastic polymer material includes polyethylene terephthalate.

9. The electrical transformer of claim 1, wherein the cellulose fibres are present in the composite material in an amount of 90 to 95 wt % of the composite material, and
   wherein the thermoplastic polymer material is present in the composite material in an amount of 5 to 10 wt % of the composite material.

10. The electrical transformer of claim 9, wherein the thermoplastic polymer material includes poly-L-lactide in an amount of 5 to 10 wt % of the composite material.

11. The electrical transformer of claim 1, wherein the composite material is formed using a method comprising:
    providing a pulp comprising the cellulose fibres;
    mixing the pulp with the thermoplastic polymer material to form a mixture;
    pressing the mixture in a paper press to form a pressboard, wherein the pressing includes:
       heating the mixture such that the thermoplastic polymer material melts to lay around and between the cellulose fibres;
       drying the mixture to remove moisture from the mixture;
       pressing the mixture into the pressboard; and
       cooling the pressboard such that the melted thermoplastic polymer material solidifies such that the thermoplastic polymer material is arranged around and between the cellulose fibres to coat said fibres and bind said fibres to each other and to form a matrix of the cellulose fibres and the thermoplastic polymer material; and
    impregnating the composite material at least partly with oil.

12. A cellulose based electrically insulating composite material for a transformer, the composite material comprising:
    cellulose fibres; and
    an electrically insulating thermoplastic polymer material having a melting point of between 140° C. and 200° C.,
    wherein the polymer material is arranged around and between the cellulose fibres, and binds said fibres to each other wherein the cellulose fibres are present in the composite material in an amount of 85 to 99 wt % of the composite material, wherein the thermoplastic polymer material is present in the composite material in an amount of 1 to 15 wt % of the composite material,
    wherein the composite material is configured to be at least partly impregnated with an insulating substance, and
    wherein drying the composite material after being at least partly impregnated with the insulating substance causes the composite material to shrink by less than 0.5%.

13. The composite material of claim 12, wherein the thermoplastic polymer material includes poly-L-lactide.

14. The composite material of claim 12, wherein the cellulose fibres are present in the composite material in an amount of 90 to 95 wt % of the composite material, and wherein the thermoplastic polymer material is present in the composite material in an amount of 5 to 10 wt % of the composite material.

15. The composite material of claim 14, wherein the thermoplastic polymer material includes poly-L-lactide.

16. The composite material of claim 12, wherein the composite material is formed using a method comprising:
providing a pulp comprising the cellulose fibres;
mixing the pulp with the polymer material to form a mixture;
pressing the mixture in a paper press to form a pressboard, wherein the pressing includes:
heating the mixture such that the thermoplastic polymer material melts to lay around and between the cellulose fibres;
drying the mixture to remove moisture from the mixture;
pressing the mixture into the pressboard; and
cooling the pressboard such that the melted polymer solidifies such that the polymer material is arranged around and between the cellulose fibres to coat said fibres and bind said fibres to each other and to form a matrix of the cellulose fibres and the thermoplastic polymer material; and
impregnating the composite material at least partly with oil.

17. The composite material of claim 16, further comprising:
drying the composite material to reduce a water content of the composite material from about 2% to about 0.5%, wherein the drying causes a thickness dimension of the composite material to shrink by less than 0.5%.

18. A method of producing a cellulose based electrically insulating composite material for an oil impregnated electrical transformer, the method comprising:
providing a pulp comprising cellulose fibres;
providing an electrically insulating thermoplastic polymer material having a melting point of between 140° C. and 200° C.;
mixing the pulp with the thermoplastic polymer material to form a mixture;
pressing the mixture in a paper press to form a pressboard, wherein the pressing includes:
heating the mixture such that the thermoplastic polymer material melts to lay around and between the cellulose fibres;
drying the mixture to remove moisture from the mixture;
pressing the mixture into the pressboard; and
cooling the pressboard such that the melted thermoplastic polymer material solidifies such that the thermoplastic polymer material is arranged around and between the cellulose fibres to coat said fibres and bind said fibres to each other and such that the composite material includes the cellulose fibres in an amount of 85 to 99 wt % of the composite material and the thermoplastic polymer material in an amount of 1 to 15 wt, and such that drying the composite material after impregnating the composite material at least partly with oil causes the composite material to shrink by less than 5%; and
impregnating the composite material at least partly with oil.

19. The method of claim 18, wherein the mixing includes adding and mixing the thermoplastic polymer material with the cellulose fibres in a solvent process and wherein the cellulose fibres are coated with the thermoplastic polymer material, as fibres of the thermoplastic polymer material or as a powder of the thermoplastic polymer material.

20. The method of claim 18, wherein the mixing comprises adding the thermoplastic polymer material to the pulp comprising the cellulose fibres, before or after grinding of the pulp.

* * * * *